United States Patent Office 2,793,631
Patented May 28, 1957

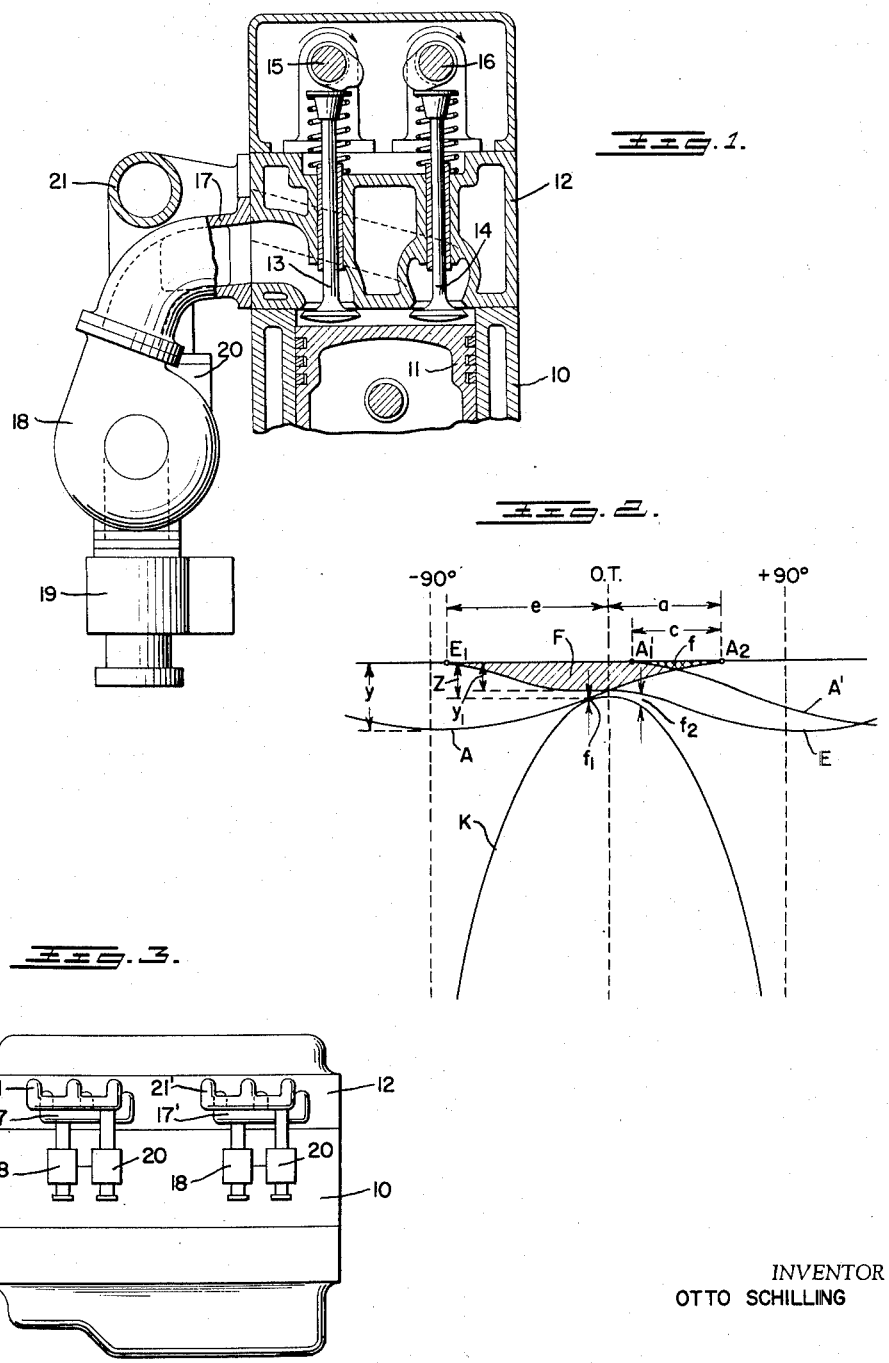

2,793,631

VALVE TIMING OF FOUR CYCLE INTERNAL COMBUSTION ENGINES WITH A GREAT OVERLAPPING OF THE EXHAUST- AND INTAKE-PERIODS

Otto Schilling, Stuttgart-Unterturkheim, Germany, assignor to Daimler-Benz Aktiengesellschaft, Stuttgart-Unterturkheim, Germany Application April 25, 1952, Serial No. 284,222

Claims priority, application Germany April 28, 1951

15 Claims. (Cl. 123—59)

The present invention relates to a valve timing of four-cycle internal combustion engines having a great overlap of the exhaust and intake periods in each cylinder. More particularly, the present invention relates to four-cycle diesel engines, of which each engine comprises a plurality of cylinders with between two to four cylinders communicating with a common exhaust manifold and with a superposed scavenging blower, as, for example, three cylinders each, for instance, of a six-cylinder engine, communicating with a common exhaust manifold and with a superposed scavenging blower.

It is accordingly an object of the present invention to provide an improved charging system for the cylinders of the types of engines described above.

It is another object of the present invention to arrange the valve timing of the individual cylinders so as to avoid disadvantageous interactions of one cylinder with respect to another.

Experiments have shown that shortly after the beginning of the exhaust period of each cylinder there occurs in the common exhaust manifold a strong pressure shock wave, which also propagates in the direction toward the other cylinders and even penetrates into the interior of these cylinders when the exhaust valves thereof are opened. If simultaneously the intake valves of these cylinders are also opened, these pressure shock waves may also reach the intake manifold. However, the scavenging and charging of the cylinders is impaired in ordinary engines by the presence of these pressure shock waves in the common exhaust manifold, the more so as they are able to penetrate other cylinders and possibly even reach the common intake manifold.

Accordingly, it is a characteristic of the present invention that in order to obtain a great overlap of the exhaust and intake periods of, for example, an angle of 120° to 150° of crankshaft rotation, the beginning of the admission or intake period by opening of the intake valve is greatly advanced in relation to the top dead-center position of the piston, preferably to about an angle of approximately 90° of crankshaft rotation ahead of the top dead-center position of the piston while the exhaust valve closes comparatively early, for example, at an angle of about 60° of crankshaft position after the top dead-center position of the piston so that the end of the exhaust period overlaps with the beginning of the exhaust period of the cylinder next in the firing cycle, which, for example, may begin shortly after the top dead-center position of the piston. Moreover, the opening of one of the exhaust valves is only so slight during the overlap period as to offer a relatively greatly throttled opening area to the gases present in the common exhaust manifold.

In that event the embodiment is preferably constructed in such a manner that the piston which is provided with a flat piston head without recess for the valves closely approaches in its position of top dead-center the intake and exhaust valves located in the cylinder head. The intake valve which is opened relatively early before the top dead-center position is opened only so slightly up to the top dead-center position of the piston, or partially closed again, that the intake valve cannot come in contact with the piston head.

The present invention permits the realization that, despite a relatively great overlap of intake and exhaust periods, which are necessary for attaining efficient scavenging and charging, the pressure shock waves which occur after the opening of the exhaust valve of the cylinder next in the firing cycle, cannot impair the operation of the preceding cylinder.

Other objects and advantages of the present invention will become obvious from the following description when taken in connection with the accompanying drawing which shows for purposes of illustration only one preferred embodiment of the present invention, and wherein:

Figure 1 is a cross-sectional view through a part of a four-cycle combustion engine with exhaust and intake valves arranged in the cylinder head, Figure 2 is a diagram showing the valve timing for the engine of Figure 1, and Figure 3 is a side elevational view of an engine in accordance with the present invention with three cylinders each connected to a common exhaust manifold.

Referring now to the drawing, and more particularly to Figure 1, reference numeral 10 designates the cylinder having a piston 11, while reference numeral 12 designates the cylinder head provided with intake valve 13 and exhaust valve 14. Intake valve 13 and exhaust valve 14 are controlled by cam shafts 15 and 16 driven at one-half of the engine speed by the crankshaft, the cams being designed in a manner to be described more fully hereinafter.

A blower 18 is arranged in the common intake manifold 17, to which a carburetor 19 may be superposed; blower 18 may be driven by a turbine 20, which itself may be driven by the waste gases of the exhaust manifold 21 common to three cylinders of the engine.

In the diagram illustrated in Figure 2, which corresponds to an internal combustion engine provided with a plurality of cylinders, of which between two to four cylinders each are connected to a common exhaust manifold, the horizontal axis or abscissa $x$—$x$ corresponds to the time or the angle of rotation of the crankshaft, O. T. indicates the top dead-center position of the piston of a cylinder, —90° indicates the position of the crankshaft 90° ahead of the top dead-center position of the piston, and +90° the position of the crankshaft 90° after the top dead-center position of the piston. Along the vertical line or ordinate, there are plotted the curves representing the displacements or lifts of the valves as well as that of the stroke $k$ of the piston head of the particular piston which has its top dead-center at O. T. The maximum distance of the valve lifts are designated as $y$, the distance of the piston head from the closed valves in the top dead-center with $z$. Moreover, the diagram refers to an engine of which three cylinders, for example, of a six-cylinder engine, exhaust into a common manifold 21. The exhaust of the cylinder first in the firing order having a piston stroke $k$ is designated by A which corresponds to the time the exhaust valve thereof is open. The intake period thereof is designated by E, corresponding to the time the intake valve thereof is open, and the exhaust period of the cylinder next in the firing order by A′, corresponding to the opening of the exhaust valve of the cylinder next in the firing cycle. The curved lines designated by A, E, and A′ also indicate along the ordinate the physical displacements or lifts of corresponding exhaust or intake valves at any particular time of the cycle.

Furthermore, $E_1$ indicates the beginning of the intake period of the first cylinder, $A_2$ the end of the exhaust period of the first cylinder, and $A'_1$ the beginning of the exhaust period of the second cylinder, i. e., the cylinder next in the firing cycle.

It is obvious from the diagram that the intake period of the first cylinder commencing at point $E_1$ takes place at an angle of the crankshaft of nearly 90° before the top dead-center position O. T. of the piston, whereas the exhaust period of the first cylinder terminates at point $A_2$ at an angle of crankshaft position $\alpha$ after the top dead-center O. T. of the piston. The overlapping opening areas of both the exhaust and intake valves of the first cylinder are indicated by cross-hatched section F. In the example illustrated in Figure 2, the end of the exhaust period of the first cylinder follows a substantially steady closing of the exhaust valve as shown by the substantially rectilinear portion of curve A, whereas the intake valve initially opened from point $E_1$ to the top dead-center O. T. a maximum distance or lift $y_1$, while a wider opening only occurs after the top dead-center O. T. of the piston as clearly shown by curve E so that the intake and exhaust valves remain at predetermined distances from the piston head while passing through the top dead-center, the distances being indicated by $f_1$ and $f_2$.

Furthermore, as may be seen from the diagram, the exhaust period of the cylinder A' next in the firing order already begins to open shortly after the top dead-center O. T. of the cylinder immediately preceding the same in the firing order at an angle $c$ of crankshaft position before the end of the exhaust period $A_2$. Despite the relatively wide angles of angular crankshaft positions during which the exhaust valves remain opened, the effective overlapping period of two exhaust valves is only slight, as follows clearly from the cross-hatched area $f$ which forms a part of the area F and which indicates such overlap. Within this part $f$, either the exhaust valve corresponding to curve A or the exhaust valve corresponding to curve A' are made to open only slightly. The main shock wave of still relatively high pressured waste gases, which flow out of a cylinder, occurs shortly or immediately after the opening of a corresponding exhaust valve, possibly during the period indicated by $c$ after the beginning of the exhaust period indicated as $A_1$. However, the exhaust valve of the preceding cylinder is already as good as closed as indicated by line A within proximity of point $A_2$ so that the waste gases which emanate from the cylinder next in the firing order find only a slight admission opening area in the preceding cylinder. Thus, there is no more danger that the pressure shocks waves of the waste gases flow through such cylinder and through the intake valve which are already wide open at that moment, as indicated by line E.

The diagram illustrates, however, that a further displacement of the end $A_2$ of the exhaust period in the direction of +90° is not permissible, as in that case the pressure shock wave which occurs during the angle $c$ of the line A' would enter through the still too wide open exhaust valve of the preceding cylinder indicated by line A, penetrate the cylinder and possibly even penetrate the intake manifold through the already wide open intake valve of the cylinder in question, as indicated by line E.

Figure 3 represents an internal combustion engine in accordance with the present invention, for example, a six-cylinder engine, in which three cylinders each are connected to a common exhaust manifold.

The particular numbers of the cylinders connected to the common exhaust manifold depend on the order of firing of the cylinders. Thus, for example, if the firing order of the six-cylinder engine is 1–5–2–6–3–4, then cylinders numbers 1, 2 and 3 and cylinders numbers 5, 6 and 4 are connected to a common exhaust manifold 21 and 21' each.

However, it is understood that the particular three cylinders connected to the common manifold may be different from the example set forth above as long as the firing order is also changed accordingly so as to provide a relationship for the valve timing mechanism as described in connection with Figure 2.

The respective cylinders which are connected to a common exhaust manifold are also preferably connected to a common intake manifold such as the intake manifolds 17 and 17' which interconnect the cylinders numbered 1, 2, 3 and 4, 5, 6 respectively. Of course, if the firing order is changed, then the particular cylinder connected to a common intake manifold must also be changed so as to correspond to the cylinders which are connected to the common exhaust manifold.

The diagram, however, illustrates that a further displacement of the exhaust end $A_2$ in direction +90° is not admissible, as in this case the pressure shock occurring in the crank angle $c$ of the curve line $A_1$ would propagate through the still too wide open exhaust valve (A) of the preceding cylinder up to the same and possibly even up to the already wide open intake manifold (E) of the concerned cylinder.

What I claim is:

1. A multi-cylinder combustion engine comprising at least a first cylinder and a second cylinder following said first cylinder in the firing cycle of a said engine, a piston within said first cylinder, a rotatable crankshaft connected to said piston whereby said crankshaft is rotated during reciprocation of said piston, an intake control member and an exhaust control member for said first cylinder, an exhaust control member for said second cylinder, a common exhaust manifold for said cylinders, means for controlling the operation of said intake control member and of said exhaust control members in dependence on the angular position of said crankshaft, said last-named means including a first means for opening said intake control member at a relatively large angular position of said crankshaft ahead of the position thereof corresponding to the top dead-center position of said piston, second means for closing said first-named exhaust control member at a relatively small angular position of said crankshaft after the position thereof corresponding to the top dead-center position of said piston, and third means for opening said second-named exhaust control member ahead of the closing of said first-named exhaust member by said second means at an angular position of said crankshaft corresponding to the top dead-center position of said piston, whereby the periods of openings of said first- and second-named exhaust control members overlap, one of said second and third means being operative to control one of said exhaust control members to provide a greatly throttled opening area during the period of said last-named overlap, said first and second means being operative to provide a period of overlap of the opening of said intake control member and said first-named exhaust control member corresponding to an angular position of at least 90° of said crankshaft.

2. The multi-cylinder combustion engine according to claim 1 wherein the opening of said intake member by said first means occurs at an angular position of said crankshaft of at least 50° ahead of the position thereof corresponding to the top dead-center position of said piston.

3. A multi-cylinder internal combustion engine with between two to four cylinders connected to a common exhaust manifold comprising at least a first cylinder and a second cylinder, following said first cylinder in the firing cycle of said engine, a piston within said first cylinder, a rotatable crankshaft connected to said piston whereby said crankshaft is rotated during reciprocation of said piston, an intake control member and an exhaust control member for said first cylinder, an exhaust control member for said second cylinder, an exhaust manifold common to said first and second cylinders, an intake manifold common to said cylinders, a blower connected to said intake manifold, first control means for said intake control member, second control means for said first-named exhaust control member, third control means for said second-named exhaust control member, means for operating said first, second, and third control means in dependence on the angular position of said crankshaft, said first control means being operative to open said intake control member at a relatively wide angular position of said crankshaft ahead of the position thereof corresponding to the top dead-center position of said piston, said second control means being operative to close said first-named exhaust member at a smaller angular position than said wide position of said crankshaft and after the position thereof corresponding to the top dead-center position of said piston, said third control means being operative to open said second-named exhaust control member at an angular position of said crankshaft shortly after the top dead-center position of said piston.

4. A multi-cylinder internal combustion engine according to claim 3, wherein said first control means is operative to open said intake control member at an angular position of almost 90° of said crankshaft and ahead of the position thereof corresponding to the top dead-center position of said piston, and wherein the angle of said smaller angular position is between 45° and 60°.

5. A multicylinder internal combustion engine according to claim 3, wherein said piston includes a flat piston head, said intake and exhaust control members are valves located in the cylinder head of respective cylinders, and said first-named control means opens said intake control member initially only slightly and delays further opening thereof for a predetermined period of the total opening period thereof.

6. A multi-cylinder combustion engine according to claim 1, wherein three cylinders each are connected to said common exhaust manifold and includes said first and second cylinders.

7. A multi-cylinder four-stroke combustion engine comprising a plurality of cylinders having a predetermined firing order, a piston within each of said cylinders, a crankshaft connected to and driven by said pistons, a common intake manifold for between two to four of said cylinders, a common exhaust manifold for between two to four of said cylinders, an intake control member and an exhaust control member for each cylinder for controllingly connecting said intake manifold and said exhaust manifold to said cylinders, means for opening each of said intake control members at a relatively large angular position of said crankshaft ahead of the position thereof corresponding to the top dead-center position of respective pistons, and means for closing each of said exhaust control members at a smaller angular position than said large angular position of said crankshaft and after the position thereof corresponding to the top dead-center position of respective pistons, said last-named means being also operative to open the exhaust control member of tthe cylinder common to said exhaust manifold and next in the firing order at an angular position of said crank shaft corresponding approximately to the top dead-center position of the piston of the cylinder immediately preceding said cylinder next in the firing order.

8. A multi-cylinder four-stroke combustion engine according to claim 7 wherein the angle of said relatively large angular position amounts almost to 90°, and the angle of said smaller angular position is between 45° and 60°.

9. A multi-cylinder four-stroke combustion engine according to claim 7 wherein said intake and exhaust manifold are connected to at least three cylinders.

10. A multi-cylinder internal combustion engine having between two to four cylinders connected to a common exhaust manifold and with an intake control member and an exhaust control member for each cylinder, a piston within each cylinder, a rotatable crankshaft connected to said piston for rotating said crankshaft during reciprocation of said pistons, first means for controlling the exhaust control member of one cylinder, second control means for controlling the intake control member of said one cylinder, and third control means for controlling the exhaust control member of the cylinder common to said exhaust manifold and next in the firing cycle of the engine, said first control means being operative to open the control member of said one cylinder at an angle of said crankshaft considerably in excess of 90° before the top dead-center position of the piston of said one cylinder and for closing the same at a predetermined relatively small angular position of said crankshaft after the top dead-center position of said last-mentioned piston, said second means being operative to open the intake control member of said one cylinder prior to the top dead-center position of the piston of said one cylinder at an angular position of said crankshaft exceeding the absolute value relative to the top dead-center position of the piston of said one cylinder of said closing of the exhaust control member of said one cylinder by said first means whereby the intake control member and the exhaust control member of said one cylinder are continuously opened in overlapping relationship over an angular displacement of said crankshaft corresponding substantially to the opening of the intake control member by said second means and the closing of said exhaust control member by said first means, said third means being operative to open the exhaust control member of the cylinder next in the firing cycle of the engine after the top dead-center position of the piston of said one cylinder and prior to closing of the exhaust control member of said one cylinder by said first means.

11. A multi-cylinder internal combustion engine according to claim 10, wherein the period of overlapping opening of the exhaust control member and of the intake control member of said one cylinder is much greater than the period of the overlapping opening of the last-mentioned exhaust control member and the exhaust control member of the cylinder next in the firing cycle.

12. A multi-cylinder internal combustion engine according to claim 11, further comprising a single intake manifold operatively connected with all the intake control members and a single exhaust manifold operatively connected to all the exhaust control members.

13. A multi-cylinder internal combustion engine according to claim 11 wherein the intake control member of said one cylinder is opened by said second means at an angular position of approximately 90° of said crankshaft before the top dead-center position of the piston of said one cylinder, and wherein the exhaust control member of said one cylinder is closed at an angular position of said crankshaft of less than 60° after the top dead-center position of said last-mentioned piston.

14. A multi-cylinder, four-stroke combustion engine comprising a plurality of cylinders having a predetermined firing order, a piston within each of said cylinders, a crankshaft connected to and driven by said pistons, a common intake manifold connected to at least three cylinders, a common exhaust manifold connected to at least three cylinders, an intake control member and an exhaust control member for each cylinder for controllingly connecting said intake manifold and said exhaust manifold to said cylinders, means for opening each of said intake control members at an angular position of said crankshaft approximately 90° ahead of the position thereof corresponding to the top dead-center position of respective pistons, and means for closing each of said exhaust control members at an angular position of between 45° and 60° of said crankshaft at the position thereof corresponding to the top dead-center position of respective pistons, said last-named means being also operative to open the exhaust control member of the cylinder connected to said common exhaust manifold and next in the firing order at an angular position of the crankshaft corresponding approximately to the top dead-center position of the piston of the cylinder immediately preceding said cylinder next in the firing order.

15. An internal combustion engine having six cylinders or multiples thereof comprising a common intake manifold for every three cylinders and a common exhaust manifold for every corresponding three cylinders, a piston within each cylinder, a rotatable crankshaft connected to said pistons whereby said crankshaft is rotated during reciprocation of said piston, an intake control member and an exhaust control member for each cylinder, means for controlling the operation of said intake control members and of said exhaust control members in dependence on the angular position of said crankshaft, said last-named means including first means for opening the intake control member of one of said cylinders at a relatively large angular position of said crankshaft ahead of the position thereof corresponding to the top dead center position of the piston in said one cylinder, second means for closing the exhaust control member of said one cylinder at a relatively small angular position of said crankshaft after the position thereof corresponding to said last-mentioned top dead center position, and third means for opening the exhaust control member of the cylinder connected to the same common exhaust manifold as said one cylinder and next in the firing order at an angular position of said crankshaft ahead of the closing of said first-mentioned exhaust member but shortly after said top dead center position so as to provide a relatively large overlapping of said first-mentioned inlet and exhaust control members and to provide relatively short overlap between said first and second-mentioned exhaust control members.

References Cited in the file of this patent

UNITED STATES PATENTS

| | | | |
|---|---|---|---|
| 1,205,095 | Kelly | Nov. 14, | 1916 |
| 2,113,077 | Buchi | Apr. 5, | 1938 |
| 2,131,959 | Kadenacy | Oct. 4, | 1938 |
| 2,281,987 | Oswald | May 5, | 1942 |
| 2,305,946 | Wilson et al. | Dec. 22, | 1942 |
| 2,306,580 | Wilson | Dec. 29, | 1942 |
| 2,644,436 | Berlyn | July 7, | 1953 |
| 2,649,083 | Vogel et al. | Aug. 18, | 1953 |

OTHER REFERENCES

Internal Combustion Engines, Lichty, fifth edition, fourth impression, McGraw-Hill Book Co., page 324.